United States Patent

Holzer, Jr. et al.

[19]

[11] Patent Number: 5,810,367
[45] Date of Patent: Sep. 22, 1998

[54] WRENCHLESS HOLDER FOR WORKING TOOLS

[75] Inventors: Michael Holzer, Jr., Wauconda; Jan Peter Houben, Chicago, both of Ill.

[73] Assignee: S-B Power Tool Company, Chicago, Ill.

[21] Appl. No.: 694,841

[22] Filed: Aug. 9, 1996

[51] Int. Cl.$^6$ .......................... B27B 19/02; B23B 31/107; B23B 31/117

[52] U.S. Cl. .......................... 279/102; 30/392; 83/699.21; 279/87

[58] Field of Search ................................ 279/76, 87, 102, 279/907, 24, 28, 29; 83/699.21; 30/337, 338, 392–394

[56] References Cited

U.S. PATENT DOCUMENTS

| | | | |
|---|---|---|---|
| 3,901,117 | 8/1975 | Hoffman | 83/835 |
| 4,299,402 | 11/1981 | Hoffman | 30/337 |
| 4,441,255 | 4/1984 | Hoffman | 30/392 |
| 4,470,196 | 9/1984 | Hoffman | 30/392 |
| 4,528,753 | 7/1985 | Kuhlmann et al. | 83/699.21 |
| 4,594,781 | 6/1986 | Hoffman | 30/392 |
| 4,601,477 | 7/1986 | Barrett et al. | 279/30 |
| 4,648,182 | 3/1987 | Hoffman | 30/392 |
| 5,443,276 | 8/1995 | Nasser et al. | 279/77 |
| 5,575,071 | 11/1996 | Phillips et al. | 30/337 |
| 5,634,277 | 6/1997 | Wada et al. | 279/76 |

FOREIGN PATENT DOCUMENTS

WO9527583  10/1995  WIPO .

OTHER PUBLICATIONS

Jun. 1996, Black and Decker Superlok Product Brochure (German).

Primary Examiner—Steven C. Bishop
Attorney, Agent, or Firm—Jones, Day, Reavis & Pogue

[57] ABSTRACT

The blade holder includes a mounting portion for attachment to the reciprocating plunger of a power saw. The blade holder also includes an integral exposed portion provided with a slot for receiving a substantial portion of the shank of the blade. The slot is dimensioned with respect to the blade shank such that an edge of the blade shank projects from the slot. The exposed portion of the blade holder includes an external surface in opposed relationship with the slot. A resiliently biased wedging washer engages the exposed edge of the blade and the external surface for holding the blade in place.

32 Claims, 3 Drawing Sheets

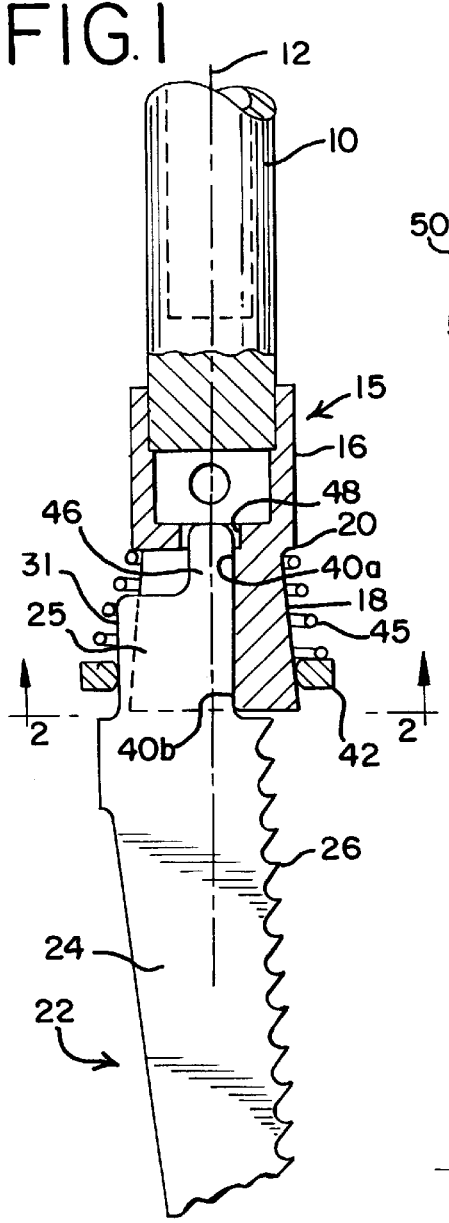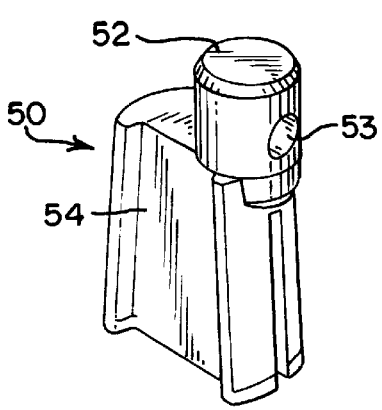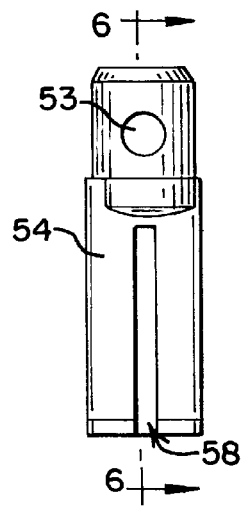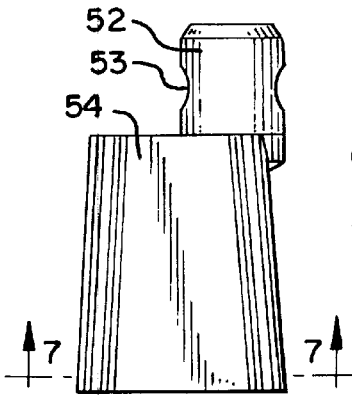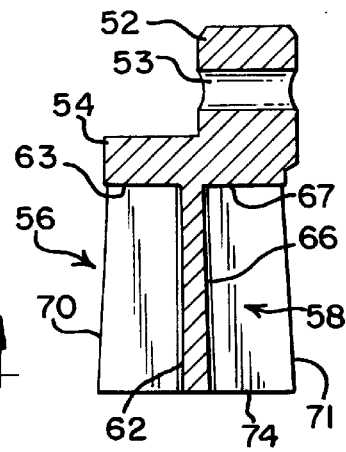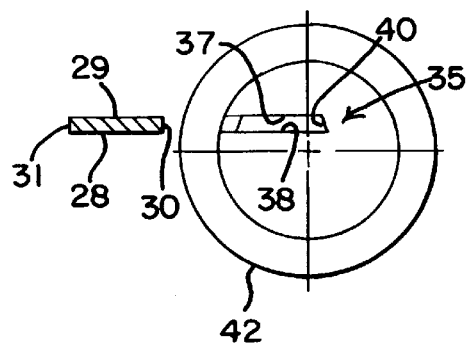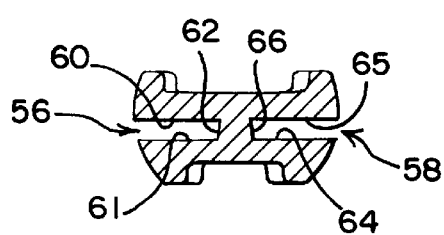

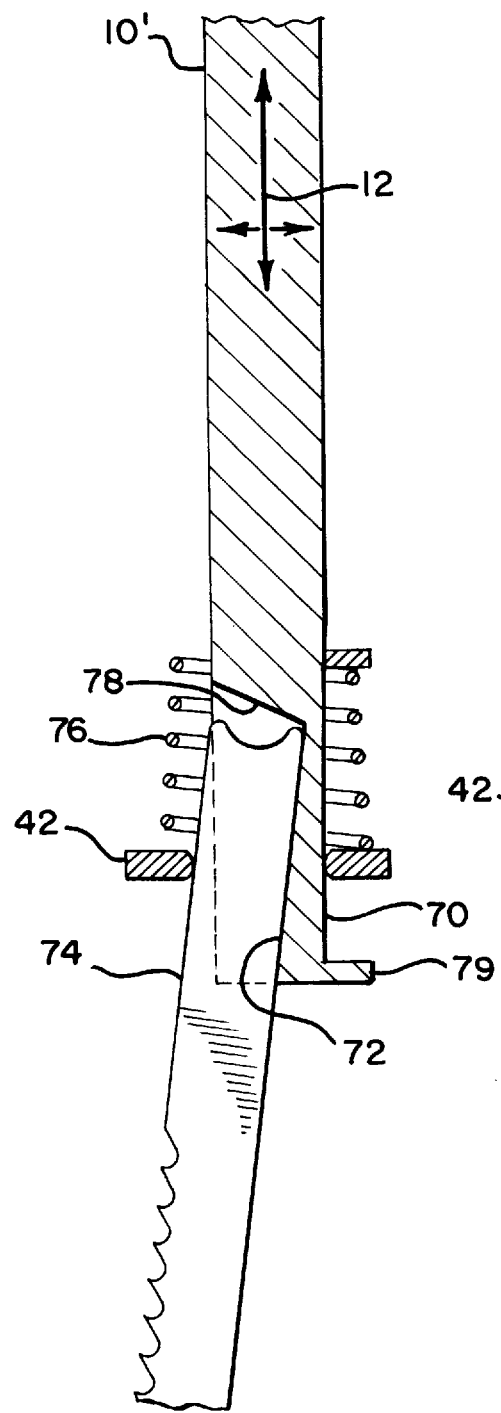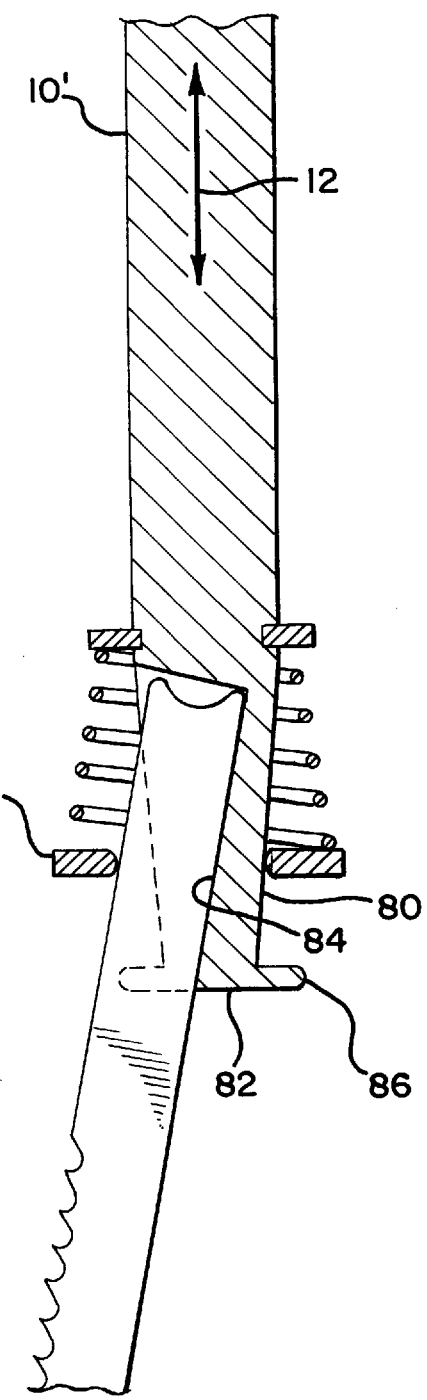

WRENCHLESS HOLDER FOR WORKING TOOLS

The present invention relates to holders for working tools. Although the present invention has particular application in the form of a blade holder for a powered reciprocating saw, such as a jig saw or saber saw, the present invention may also be used to hold other working tools, such as files and sanding devices.

BACKGROUND OF THE INVENTION

Powered reciprocating saws, such as jig saws and saber saws, have blade holders for readily attaching and detaching the blades. The blade must be attached very securely to the reciprocating member since the blade is subjected to extreme forces during use tending to dislodge the blade.

Prior art blade holders include the use of one or more set screws to hold the blade in place. Tightening and untightening of these screws require the use of a separate tool. Further, the blades must be provided with one or more apertures or recesses to receive the set screws. Consequently, this type of mounting has the disadvantages just mentioned.

Other blade holders have been provided in the form of a camming member which engages a face of the shank portion of the blade for holding the same in place. An example of this approach is represented by U.S. Pat. No. 5,443,276, assigned to the assignee of the present invention.

Another approach is the use of a roller which is cammed against a face or edge of the shank portion of the blade. Examples of this approach are U.S. Pat. No. 4,601,477 and the Black & Decker SUPERLOK blade holder.

Another type of blade holder uses a cam or roller which is received within a notch or recess in the edge of the blade. Representative of this type of blade holder is Hoffman U.S. Pat. No. 4,470,196. This arrangement is disadvantageous in that it requires special blades; the blades must have notches or recesses formed in the edge of the shank portion of the blade.

SUMMARY AND OBJECTS OF THE PRESENT INVENTION

A primary object of the present invention is the provision of a holder which will accept an unnotched or unapertured shank portion of a blade or other working tool, which will hold the tool firmly in use, and which will permit ready release of the tool.

A primary object of the present invention is the provision of a new and improved working tool holder having a simple but effective camming means for engaging an edge of the shank portion of the tool for securely holding the same in place.

Another object of the invention is the provision of a working tool holder which permits easy attachment and detachment of the tool without the use of other tools, such as screwdrivers or wrenches.

Still another object of the present invention is the provision of a working tool holder of the type described which will accept tool shanks of varying thicknesses.

Yet another object of the present invention is the provision of a new and improved working tool holder of the type described which lends itself to inexpensive manufacture and trouble-free operation.

These and other objects and advantages of the invention will become apparent from the following specification disclosing preferred embodiments as shown in the accompanying drawings.

DESCRIPTION OF THE DRAWINGS

FIG. 1 is a partial section and partial side elevational view of the present invention in the form of a blade holder showing the same attached to a reciprocating plunger and mounting a saw blade;

FIG. 2 is a partial section and partial end view taken along the line 2—2 of FIG. 1 and showing the blade removed from the slot in the blade holder;

FIG. 3 is an isometric view of a preferred form of blade holder;

FIG. 4 is an end view of the blade holder of FIG. 3;

FIG. 5 is a side elevational view of the blade holder of FIG. 3;

FIG. 6 is a section taken along the line 6—6 of FIG. 4;

FIG. 7 is a section taken along the line 7—7 of FIG. 5;

FIG. 8 is a diagrammatic view of another embodiment of the invention;

FIG. 9 is a diagrammatic view of yet another embodiment of the invention;

DESCRIPTION OF THE INVENTION

Figure 10:
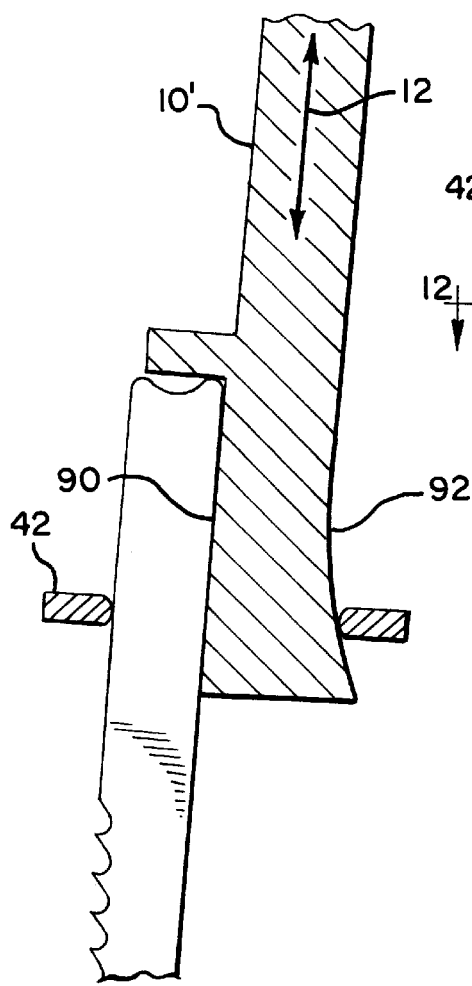
FIG. 10 is a diagrammatic view of still another embodiment of the invention.

FIGS. 1 and 2 show a first embodiment of the invention as applied to a powered reciprocating saw (not shown), such as a jig saw or saber saw, having a plunger tube 10. It will be understood that this plunger is reciprocated along the axis 12 when the power tool is energized. The holder of the present invention may be used with reciprocating saws and other power tools which provide an orbital path of movement to the working tool. The term "substantially rectilinear" as used herein means both reciprocating movement and a secondary movement, such as an orbital movement.

The blade holder, generally designated 15, includes a cylindrical portion 16 mounted to the plunger 10 by any suitable means. The mounting portion 16 of the blade holder 15 is integral with a frusto-conical blade holder portion 18. An annular ridge 20 is formed at the juncture of the cylindrical mounting portion 16 and the frusto-conical portion 18 which is exposed from the housing of the power tool for ready access by the operator.

A conventional saw blade, generally designated 22, includes a blade portion 24 and a shank portion 25. The blade portion 24 includes a rectilinear series of teeth 26 forming the sawing edge of the blade 22. As noted from FIG. 2, the shank portion 25 of the blade is rectangular in cross-section having opposed side faces 28, 29 and opposed edge surfaces 30 and 31.

At this time it should be pointed out that the present invention also has applicability to other forms of working tools which perform the work by powered movement which is substantially reciprocal in form. These working tools include files and sanding devices, for example. Each of these working tools has a rectangular in cross-section shank portion with parallel opposed sides faces, similar to the blade faces 28 and 29, and parallel opposed edge surfaces, similar to the blade edges 30 and 31.

Returning now to this embodiment of FIGS. 1 and 2, the exposed portion 18 of the blade holder 15 is provided with a slot, generally designated 35, for receiving a substantial portion of the shank portion of the blade. To this end, the slot 35 includes opposed parallel walls 37 and 38 and a rectilinear inner wall 40. The inner wall 40 has an inner end 40a and an outer end 40b. The side walls 37 and 38 are spaced apart a distance slightly in excess of the thickness of the shank portion of the blade as measured between the faces 28 and 29. It will be noted that the inner wall 40 of the slot 35, which is parallel with the axis 12, is beveled with respect to the side walls 37 and 38. When the thickness of the blade is significantly less than the width of the slot, the beveled wall 40 tends to cam the blade into the slot with the blade face 28 in substantial coextensive engagement with the slot side wall 38 for more securely mounting the shank portion of the blade within the slot of the blade holder.

A wedging or camming washer 42 is mounted on the blade holder 15 in concentric relationship with the latter. It will be noted that the slot 35 is dimensioned with respect to the shank portion of the blade such that a portion of the shank 25 of the blade will project from the slot. In particular, when the edge surface 30 is engaged with the slot inner surface 40, the edge surface 31 of the blade shank portion will project outwardly of the slot 35 for being engaged by the inner surface of the wedging ring 42. The wedging ring 42 also engages the frusto-conical exposed portion 18 of the blade holder. The wedging washer will engage the exposed edge 31 of the blade and the portion 18 of the blade holder at two areas which are substantially diametrically oppositely disposed with respect to the wedging washer 42. It will be apparent that as the wedging washer 42 is forced downwardly as seen in FIG. 1, the wedging washer will become tightly engaged with the edge of the blade 31 and the frusto-conical portion 18 which acts as a cam surface.

A coil spring 45 is mounted in concentric relationship with respect to the blade holder and has one end thereof in abutting engagement with the annular ridge 20 and the other end thereof in abutting engagement with the upper surface of the wedging washer 42. The spring 45 acts to hold the washer in snug engagement with the blade edge 31 and the exposed portion 18 of the blade holder for securely mounting the saw blade in place. However, when it is desired to release the blade, the washer 42 may be readily moved manually by the operator for releasing the blade. The wedging washer will not become jammed in place as it contacts only the outer edge 31 of the blade and a small area of the outer surface of the frusto-conical exposed portion 18.

Saw blade 22 shown for purposes of illustration includes a tip 46 which is used in other types of blade holders. The cylindrical portion 16 of the blade holder includes a centrally disposed opening 48 at the inner end of the slot for receiving the tip 46 of the blade.

A preferred form of blade holder is shown in FIGS. 3–7. This holder includes a base 50 having a cylindrical mounting portion 52 for being received within the plunger tube of a power saw such as a reciprocating saw, saber saw or jig saw. The mounting portion is provided with a through-bore 53 to facilitate mounting of the blade holder to the plunger tube of the tool.

The blade holder 50 includes a body portion 54 which will be exposed with respect to the housing of the power tool. The blade holder 50 is made of a suitable material, such as metal; the mounting portion 52 and the exposed portion 54 are integral.

The exposed portion 54 is provided with first and second oppositely disposed slots, generally designated 56 and 58. The slot 56 includes opposed side walls 60 and 61 and a rectilinear beveled inner wall 62. The slot 56 terminates at a base wall 63. The slot 58 includes opposed side walls 64, 65 and a rectilinear beveled inner wall 66; this slot terminates at base wall 67.

The provision of the two slots 56, 58 permits mounting of a blade at different positions with respect to the axis of the reciprocating plunger. The slots 56, 58 may be of different widths to accommodate blades of different thicknesses.

The exposed portion 54 defines rectilinear cam outer surfaces 70 and 71 (FIG. 6) which extend from the end 74 of the exposed portion 54 (which is remote from the mounting portion 52) to the end of exposed portion which is adjacent the mounting portion of the blade holder. As in the embodiment of FIGS. 1 and 2, the slots 56, 58 are dimensioned such that an edge portion of the blade will project from the slot in use. Thus, the wedging washer 42, when used with the blade holder 50, will engage the exposed edge of the blade and one of the cam surfaces 70, 71, depending on which slot is used to receive the blade.

The inner wall 62 of the slot 56 is parallel with the axis of reciprocation of the tool plunger. However, the inner wall 66 of the slot 58 is inclined with respect to such axis since the inner wall 66 is canted outwardly of the blade holder as it extends from its end adjacent the base wall 67 to its end adjacent the end 74 of the exposed portion 54. Thus, the camming action will be somewhat enhanced when the slot 58 is used to receive the blade.

FIG. 8 shows, in diagrammatic form, a further embodiment of the invention. Here, the exposed portion 70 of the blade holder is cylindrical. However, the rectilinear inner wall 72 of the slot is inclined with respect to the axis of reciprocation to provide the camming or wedging function. The inclined inner wall 72 will cause the exposed blade edge 74 to be similarly inclined such that the blade will be wedged in the slot by the wedging washer 42 which is biased downwardly by the coil spring 76. The inner wall 72 may also be beveled to accommodate blades of different thicknesses as described above. Since the inner wall 72 of the slot is inclined, the base wall 78 of the slot will also be at an angle as shown in FIG. 8. The holder includes a stop formation 79 to retain the wedging washer 42 when a blade is not mounted in the slot.

FIG. 9 diagrammatically illustrates a still further embodiment of the invention. In this case the exposed portion 80 of the blade holder is frusto-conical but tapers inwardly as it proceeds toward its lower end 82. The camming or wedging action is achieved by having the inner wall 84 of the slot inclined with respect to the axis of reciprocation 12 at an angle greater than the angle of taper of the frusto-conical portion 80. Again, a stop formation 86 is provided to retain the washer 42 when a blade is not received in the slot.

FIG. 10 diagrammatically illustrates yet another embodiment of the invention. Here, the blade holder has a slot with an inner wall 90 which is parallel with the axis of reciprocation 12. However, the external surface 92 of the exposed portion is progressively inclined outwardly and away from the slot in the form of a curve. Thus, the term "inclined" as used herein means both a rectilinear inclined surface and a curved surface.

It will be noted that in the embodiments of FIGS. 8, 9 and 10, the blade holder is formed as an integral part of the reciprocating plunger 10'. Thus, the blade holder element need not be in the form of a separate body member as is the case with the embodiment of FIGS. 1 and 2 and the embodiment of FIGS. 3–7.

Figure 11:
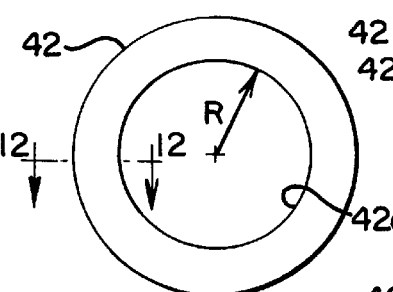
FIG. 11 is a plan view of a wedging washer forming part of the invention.
Figure 12:
FIGS. 12, 12A and 12B are sections taken along the line 12—12 of FIG. 11.
Figure 12A:
Figure 12B:

FIG. 11 is a plan view of the wedging member 42. As seen in FIGS. 12 and 12A, the inner surface 42a of the wedging washer may be curved at various radii or formed flat as shown in FIG. 12B. It has been found that the wedging action is enhanced when a curved inner surface is employed.

Figure 13:
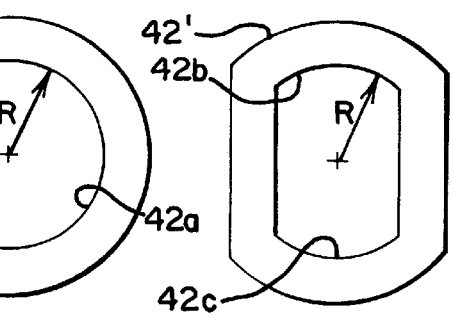
FIG. 13 is a plan view of an alternate form of wedging member.

FIG. 13 illustrates a modified form of wedging washer 42'. It is seen that the wedging member need not be circular. However, the wedging washer 42' is preferably provided with opposed inner arcuate surfaces 42b and 42c for engagement with the outwardly projecting edge surface of the working tool and the oppositely disposed external surface on the exposed portion of the blade holder.

In all embodiments of the invention, the blade or other working tool is mounted to the reciprocating member by first lifting the wedging washer followed by insertion of the shank portion of the blade into the slot until the end of the shank comes into engagement with the base wall of the slot, such as the base wall 78 shown in FIG. 8. The wedging washer is then released whereupon the spring will act to force the inner surface of the wedging washer into tight engagement with the exposed edge surface of the shank portion and an oppositely disposed external surface on the holder. During operation, engagement of the working tool with the work tends to pull the blade or other working tool from the slot. As the shank portion becomes tightly wedged by the wedging washer, the end of the blade will separate slightly from the base wall of the slot as seen in FIGS. 8 and 9, for example.

Figure 14:
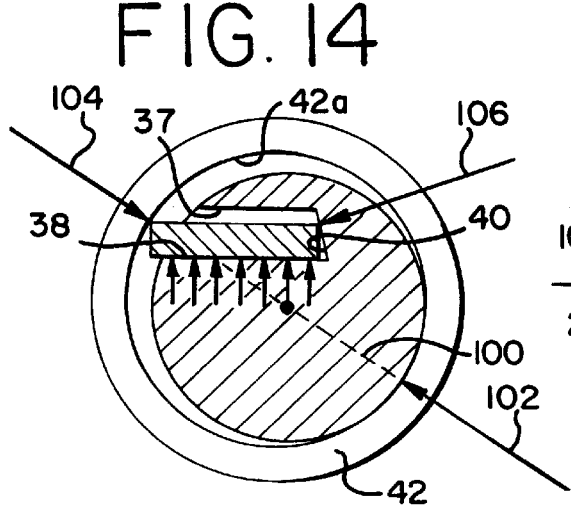
FIG. 14 is a section similar to FIG. 2 and illustrating the forces involved in wedging the blade in the slot.

Reference should be had to FIG. 14 for an understanding of the forces involved in wedging the blade shank in the slot. Considering the embodiment of FIGS. 1 and 2, for example, it will be noted that the slot walls 37, 38 are not parallel, but rather are offset or canted, with respect to an imaginary line 100 which extends between the areas of contact on the wedging washer surface 42a indicated by the force arrows 102 and 104. This offset or canted arrangement of the slot is preferred when the thickness of the blade shank 25 is significantly less than the width of the slot since the wedging washer 42 will force the blade face 28 into substantial coextensive engagement with the slot wall 38 and one corner of the blade shank into engagement with the beveled inner wall 40 as indicated by the force arrow 106. It is desirable that at least one face of the blade shank be wedged into substantial coextensive contact with one side wall of the slot.

Figure 15:
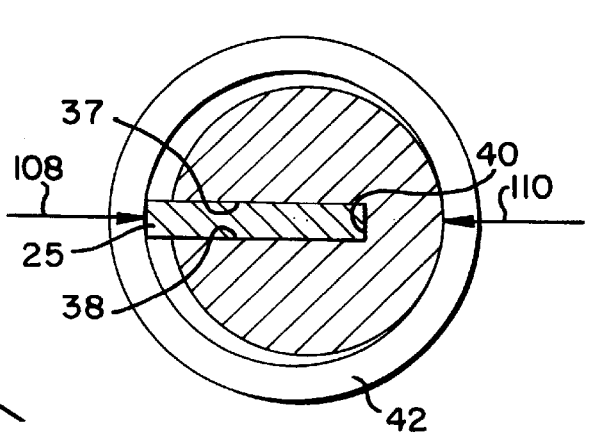
FIG. 15 is a section similar to FIG. 2 and showing a blade with a thickness substantially the same as the width of the slot.

FIG. 15 shows an arrangement where the thickness of the blade shank portion 25 is substantially the same as the width of the slot between the side walls 37 and 38. Here, the inner slot wall 40 need not be beveled. Further, the slot side walls need not be offset from an imaginary line extending between the areas of contact on the wedging ring surface 42a as indicated by the force arrows 108 and 110.

Accordingly, it is seen that the present invention provides a simple but effective holder for securely mounting a blade or other working tool to the reciprocating plunger of a power tool. The blade or other working tool may be readily attached and detached simply by manual manipulation of the wedging washer 42. The holder will accommodate a wide variety of blades or other working tools. The holder of the present invention does not require that the working tool shank portion have apertures, notches, recesses or special formations of any kind.

Although several embodiments of the invention have been shown for purposes of illustration, it will be understood that the invention is not to be limited to the particular embodiments shown. The invention is susceptible of various modifications and variations coming within the scope of the following claims.

We claim:

1. A holder for mounting a working tool to a power tool, wherein the working tool has a working portion and a shank portion with a rectangular cross-section defined by a pair of oppositely disposed faces and a pair of oppositely disposed edge surfaces and having no projections or recesses along said oppositely disposed edge surfaces, said holder comprising:

(a) an exposed holder formation connected to a power tool for reciprocation along a substantially rectilinear axis, said exposed formation having at least one tool receiving opening with at least one side wall for bearing against a face of said tool shank and a rectilinear inner wall for receiving a substantial portion of the shank portion of the working tool for mounting the working tool with one of said edge surfaces in engagement with said inner wall, said opening being dimensioned with respect to the shank portion such that the other of said edge surfaces of the shank portion projects outwardly of the opening, said exposed holder formation also having an external surface in generally oppositely disposed relationship with the other of said edge surfaces of the shank portion of said working tool when said tool is received by said opening, at least one of said inner wall and said external surface being inclined with respect to said axis;

(b) a wedging member supported by said exposed holder formation for engagement with said external surface and said other edge surface of the shank portion; and (c) resilient means engaged with said wedging member for wedging said shank portion of the working tool into said opening.

2. The holder according to claim 1 wherein said opening is a slot and said inner wall has an inner end and an outer end, and wherein said external surface has an outer portion adjacent the outer end of said slot inner wall and an inner portion adjacent the inner end of said slot inner wall, said outer portion of the external surface being spaced a distance from the outer end of said slot inner wall greater than the distance between the inner wall of the external surface and the inner end of the slot inner wall.

3. The holder according to claim 2 wherein said external surface is rectilinear.

4. The holder according to claim 2 wherein said external surface is curved.

5. The holder according to claim 2 wherein the slot inner wall is substantially parallel with said axis.

6. The holder according to claim 3 wherein said slot inner wall is substantially parallel with said axis.

7. The holder according to claim 4 wherein said slot inner wall is substantially parallel with said axis.

8. The holder according to claim 2 wherein said wedging member is in the form of a ring which engages said external surface and said other edge surface of the shank portion of the working tool at generally diametrically oppositely disposed portions of the ring.

9. The holder according to claim 8 wherein said resilient means comprises a spring.

10. The holder according to claim 9 wherein said spring is a coil spring concentrically disposed with respect to said ring.

11. The holder according to claim 1 wherein said opening is a slot and said slot has oppositely facing side walls, the distance between said side walls being greater than the thickness of said shank portion of the working tool as measured between said faces thereof, said inner wall being beveled with respect to said side walls.

12. The holder according to claim 2 wherein said one side wall of the slot is canted with respect to an imaginary line extending between the areas of engagement of the wedging number with said external surface and said other edge surface of the shank portion.

13. The holder according to claim 12 wherein said inner wall is at a bevel angle with respect to said one side wall of the slot.

14. A holder for a power tool wherein the blade has a sawing portion and a shank portion with a rectangular cross-section defined by a pair of oppositely disposed faces and a pair of oppositely disposed edge surfaces, said blade holder comprising:

(a) an exposed holder formation mounted by the power tool for reciprocation along a substantially rectilinear axis, said exposed formation having a slot including at least one side wall and a rectilinear inner wall for receiving a substantial portion of the blade shank for mounting the blade with one of said edge surfaces in engagement with said inner wall, said slot inner wall being substantially parallel with said axis and having an inner end and an outer end, said slot being dimensioned with respect to the blade shank such that the other of said edge surfaces of the blade projects outwardly of the slot, said exposed holder formation defining an external cam surface having a first end adjacent said inner end of said slot inner wall and a second end adjacent said outer end of said slot inner wall, said second end being spaced a distance from said slot outer end which is greater than the distance between said first end and said slot inner end;

(b) a wedging member supported by said exposed portion of the holder element for engagement with said external cam surface and said other edge surface of the blade; and (c) resilient means engaged with said wedging member for wedging said shank portion of the blade into said slot.

15. The blade holder according to claim 14 wherein said external cam surface is substantially rectilinear.

16. The blade holder according to claim 14 wherein said external cam surface is curved.

17. The blade holder according to claim 14 wherein said wedging member is in the form of a ring which engages said cam surface and said other edge surface of the blade shank at generally diametrically oppositely disposed portions of the ring.

18. The blade holder according to claim 17 wherein said resilient means comprises a spring.

19. The blade holder according to claim 18 wherein said spring is a coil spring concentrically disposed with respect to said ring.

20. The blade holder according to claim 14 wherein said slot has oppositely facing side walls, the distance between said side walls being greater than the thickness of said shank portion of the blade as measured between said faces thereof, said inner wall being beveled with respect to said side walls.

21. A tool holder for a power tool where a tool for said tool holder has a shank portion with generally parallel oppositely disposed side faces and oppositely disposed edges, said edges being rectilinear and being without projections or recesses, said tool holder comprising:

a base;

said base having a slot formed through a portion thereof;

said slot having opposing generally parallel walls for alignment with the side faces of said tool shank;

said slot being rectilinear and having an inner wall for abutting one of the edges of said tool shank;

said base including an outer surface;

a wedging member positioned around said base and adapted to contact the other of said edges of said tool shank and to contact a portion of said outer surface at a region generally diametrically opposed to the contact wedging member and the other of said edges of said tool shank; and a resilient element engaged with said wedging member for biasing said wedging member into contact with said other of said shank edges and with said portion of said outer surface.

22. An apparatus as claimed in claim 21 wherein:

said base has a longitudinal axis; and said inner wall is inclined relative to said longitudinal axis.

23. An apparatus as claimed in claim 21 wherein:

said base has a longitudinal axis; and said inner wall is rectilinear and generally parallel to said longitudinal axis.

24. An apparatus as claimed in claim 21 wherein:

said inner wall of the slot is beveled relative to said opposing side faces of said slot.

25. An apparatus as claimed in claim 21 wherein:

said base has at least a partial circular cross-section; and said slot has at least one of its faces intersecting radial lines of said at least partially circular cross-section base.

26. An apparatus as claimed in claim 21 wherein:

said base has at least a partial circular cross-section;

said slot has at least one of its walls intersect radial lines of said at least partially circular cross-section base; and including a second slot having opposing walls wherein at least one of said walls of said second slot intersects a radial line of said at least partially circular cross-section base.

27. An apparatus as claimed in claim 26 wherein:

said inner wall of said first mentioned slot is beveled in relation to said side faces of said first mentioned slot; and including opposing faces and an inner wall defining said second slot and said inner wall of said second slot is beveled in relation to said opposing faces of said second slot.

28. An apparatus as claimed in claim 27 wherein:

the inner wall of said first mentioned slot is rectilinear; and the inner wall of said second slot is rectilinear and inclined.

29. An apparatus as claimed in claim 21 wherein:

said base includes an offset mounting portion, said mounting portion for engaging said power tool.

30. A tool holder for a power tool comprising:

a base having at least a partial circular cross-section;

an opening formed in said base for receiving a tool having a shank portion with generally parallel oppositely disposed side faces and oppositely disposed edges, said edges being rectilinear and being without projections or recesses;

said opening having a generally flat surface for bearing against the face of said tool shank and an inner surface for bearing against an edge of said tool shank; and a wedging member positioned around said face and adapted to contact the other of said edges of said tool shank.

31. An apparatus as claimed in claim 30 wherein:

said flat surface in cross-section is disposed to intersect a radial line of said at least partially circular cross-section base.

32. An apparatus as claimed in claim 31 wherein:

a second opening is formed in said base for receiving a tool having a shank portion with generally parallel oppositely disposed side faces and oppositely disposed edges, said edges being rectilinear and being without projections or recesses;

said second opening having a generally flat surface for bearing against a face of said tool shank and an inner wall for bearing against an edge of said tool shank; and said flat surface of said second opening is in cross-section disposed to intersect a radial line of said at least partially circular cross-section base.

* * * * *